United States Patent [19]

Korbel et al.

[11] Patent Number: 4,553,982

[45] Date of Patent: Nov. 19, 1985

[54] COATED ABRASIVE CONTAINING EPOXY BINDER AND METHOD OF PRODUCING THE SAME

[75] Inventors: Gerald E. Korbel, Little Canada; Janis Robins, St. Paul; Harold E. Rude, Roseville, all of Minn.

[73] Assignee: Minnesota Mining and Manufacturing Co., Saint Paul, Minn.

[21] Appl. No.: 708,242

[22] Filed: Mar. 5, 1985

Related U.S. Application Data

[63] Continuation-in-part of Ser. No. 616,438, May 31, 1984, Pat. No. 4,503,211.

[51] Int. Cl.$^4$ .................................................. C09K 3/14
[52] U.S. Cl. ......................................... 51/298; 51/294; 51/295; 427/214; 427/221; 427/386; 427/411; 427/412; 428/240; 428/241; 428/244; 428/264; 428/326

[58] Field of Search ................ 51/294, 295, 298; 427/214, 221, 386, 411, 412; 428/240, 241, 244, 264, 326

[56] References Cited

U.S. PATENT DOCUMENTS

| | | | |
|---|---|---|---|
| 3,359,241 | 12/1967 | Dobinson | 260/446 X |
| 3,542,828 | 11/1970 | Harris | 260/446 |
| 3,565,861 | 2/1971 | White et al. | 260/47 |
| 3,713,796 | 1/1973 | Valerio et al. | 51/298 |
| 3,813,231 | 5/1974 | Gilbert et al. | 51/298 |
| 3,879,312 | 4/1975 | Udding et al. | 260/446 |
| 4,379,908 | 4/1983 | Brownscombe | 528/92 X |

*Primary Examiner*—Earl Nielsen
*Attorney, Agent, or Firm*—Donald M. Sell; James A. Smith; Richard Francis

[57] ABSTRACT

The use of an aromatic amine salt of a substituted pentafluoroantimonic acid as a curing agent for epoxy resins, and the use of the epoxy resin compositions as binders for abrasives in abrasive sheet products, are disclosed. The aromatic amines are selected from aniline and hindered aromatic amines.

14 Claims, No Drawings

4,553,982

COATED ABRASIVE CONTAINING EPOXY BINDER AND METHOD OF PRODUCING THE SAME

RELATED PRIOR APPLICATIONS

This application is a continuation-in-part application of prior copending application Ser. No. 616,438, filed May 31, 1984, now U.S. Pat. No. 4,503,211.

DESCRIPTION

1. Technical Field

This invention relates to coated abrasive products having an epoxy resin binder which holds and supports abrasive granules on a backing sheet. In another aspect, the invention relates to a method of making such a coated abrasive product employing liquid epoxy resin and a novel curing agent therefore.

2. Background Art

Coated abrasives or coated abrasive products generally comprise a flexible backing upon which an adhesive binder holds and supports a coating of abrasive granules. The backing may be paper, cloth, film, vulcanized fiber, etc. or a combination of one or more of these materials. The abrasive granules may be formed of flint, garnet, aluminum oxide, alumina:zirconia, diamond, silicon carbide, etc. Popular present day binders are phenolic resins, hide glue and varnish. Besides phenolic resins, hide glue and varnish, other known resinous binder materials employed in the preparation of coated abrasive products include epoxy resins, ureaformaldehyde and polyurethane resins.

The coated abrasive may employ a "make" coat of resinous binder material which is utilized to secure the ends of the abrasive granules onto the sheet as the granules are oriented and a "size" coat of resinous binder material over the make coat which provides for firm adherent bonding of the abrasive granules to the sheet. The size coating may be the same as the make coating or of different resinous material.

The popular presently used binders for coated abrasives have many disadvantages. Hide glue make coatings are generally required to be applied hot (about 150° F.) and must be cooled below their gel temperature before another coat can be applied. Hide glue size coatings are also generally applied hot, requiring drying times on the order of 30 minutes to 2 hours at 100°–135° F. Hide glue is also water-soluble and may result in removal of the abrasive granules upon exposure to moisture. Varnish make coatings generally require cure or drying times of about 8 hours at about 195° F. Phenolic size coatings require at least 2 hours to cure at 195° F. Phenolic coatings are also usually precured for at least one hour.

While epoxy resins appear to be good candidates for the binder material of a coated abrasive product, and some have been used for this purpose, the abrasive products employing epoxy resin binders have not been satisfactory because of deficiencies in the coating process, mainly because of curing time.

Epoxy resins are monomers or prepolymers that further react with curing agents to yield high-performance thermosetting plastics. They have gained wide acceptance in protective coatings and electrical and structural applications because of their exceptional combination of properties such as toughness, adhesion, chemical resistance, and superior electrical properties.

Epoxy resins are characterized by the presence of a 3-member cyclic ether group commonly referred to as an epoxy, 1,2-epoxide, or oxirane group. The epoxy resins are commonly cured, or caused to harden, by the addition of a curing or hardening agent. Curing agents commonly used to convert epoxy resins to thermosets include anhydrides, amines, polyamides, Lewis acids, and others. Many curing agents begin to react immediately, or after a short period of time, even at room temperature or lower temperatures. This requires that the epoxy resin and the curing agent be stored separately and only mixed immediately before use. This is extremely inconvenient in some cases and also leads to waste if part or all of the mixture cannot be used in time.

While various attempts have been made to prolong the cure time or "pot life" of curable epoxy resin compositions, they have met with limited success. The preferred curing agents, Lewis acids, cannot be used where appreciable pot life of the composition is required. Because of the rapidity with which the Lewis acid brings about curing of the epoxy resin compositions, various attempts have been made to modify the Lewis acid in order to prolong the cure time or pot life of the composition. One method of accomplishing this result has called for the formation of a complex of the Lewis acid with a nucleophilic reagent such as an ether, alcohol, amine or the like. It has been generally found, however, that any increase in pot life of epoxy compositions containing the modified version of the Lewis acid results in a corresponding sacrifice of cure time and/or physical characteristics of the resultant cured resin.

Various references disclosing the preparation and/or use of curing agents for epoxy resins and/or other curable compositions are discussed below.

Harris (U.S. Pat. No. 3,542,828) discloses hexafluoroantimonate amine catalysts useful in cationic polymerization of vinyl ether. Harris reacts fluoroantimonic acid or its alkaline salt with amines such as aniline, diphenylamine, triphenylamine, methylamine, diethylamine, trimethylamine, nonylamine, trichlorophenylamine, tritolylamine and the like to produce his catalyst. Experimentation has shown that the Harris catalyst does not appreciably increase the pot life of epoxy resin compositions to produce a room temperature latent composition which cures rapidly with heating. In fact, some epoxy resin compositions catalyzed with the Harris catalyst have been found to cure rapidly as low as 0° C.

White et al (U.S. Pat. No. 3,565,861) discloses amine complexes of phosphorous pentafluoride, arsenic pentafluoride, or antimony pentafluoride with a primary acylic aliphatic amine to provide latent curing agents for epoxy resins. This patent points out that amines having the $NH_2$ group attached directly to an unsubstituted aromatic ring form complexes which function as rapid curing agents but are not sufficiently stable to be latent curing agents.

Udding et al (U.S. Pat. No. 3,879,312) discloses a process for the preparation of polyester polyols by cationic polymerization of organic cyclic ethers using hydroxyl ammonium hexafluoroantimonate catalysts. Such catalysts have been found not to provide an appreciably long pot life for epoxy resin compositions and have been found to cause such epoxy compositions to cure at relatively low temperatures, even as low as 36° C.

Buck et al (U.K. Pat. Spec. No. 963,058) discloses room temperature storable mixtures of epoxy resin and a curing agent provided by the amine salt of hydrofluoroboric acid. Any amine appears to be suitable including primary, secondary, tertiary aliphatic or aromatic amine, heterocyclicamine, or alicyclic amine, with or without nuclear or side-chain substituents, although the aromatic amines are designated as preferred, because of curing temperature considerations.

While certain of the modified catalysts or curing agents known in the prior art have been somewhat successful in prolonging the cure time or pot life of a curable epoxy composition, few are known to applicant to provide a significant increase in pot life which, for example, permits storage of the mixture of epoxy resin composition and curing agent for a matter of days at room temperature yet provides rapid cure at an elevated curing temperature.

DISCLOSURE OF THE INVENTION

In accordance with the present invention, an improved coated abrasive employing epoxy resin binder is provided. Binding is accomplished by the use of a one-part latent, room-temperature stable epoxy resin-catalyst system which is curable to epoxy binder. The curable epoxy resin contains a novel modified Bronsted acid catalyst system or curing agent. The catalyst and the curable epoxy resin are described in prior copending application Ser. No. 616,438, filed May 31, 1984, now U.S. Pat. No. 4,503,211.

The curing agent comprises a liquid salt of a substituted pentafluoroantimonic acid and an aromatic amine selected from the group consisting of aniline and hindered amine. The mole ratio of substituted pentafluoroantimonic acid to aromatic amine is in the range of 1:1.05 to 1:4. The substituted pentafluoroantimonic acid has the formula $H^+SbF_5X$, wherein X is halogen, hydroxy, or -OR. "OR" is the residue of an aliphatic or aromatic alcohol preferably having a molecular weight of 32 to 100,000, or more, and a primary or secondary hydroxyl functionality of at least 1, preferably at least 2. The most preferred alcohol is diethylene glycol, i.e., making the -OR group 2-(2-hydroxyethoxy)ethoxy.

In the preferred curing agent, the hindered amine has the general formula

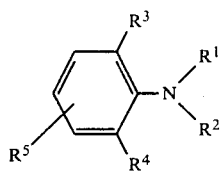

wherein $R^1$ and $R^2$ are independently hydrogen, primary or secondary lower alkyl group having 1–6 carbon atoms, or benzyl;

$R^3$, $R^4$, and $R^5$ are independently hydrogen, an electron donating group, benzyl, or at least one of $R^3$ and $R^4$ is joined together with $R^5$ to form a benzo group;

provided that, if no benzo group is present in the hindered amine, at least one of $R^1$, $R^2$, $R^3$, and $R^4$ is an alkyl group or an electron donating group; and if $R^3$, $R^4$ and one of $R^1$ or $R^2$ is hydrogen, the other of $R^1$ or $R^2$ is an alkyl group having at least 2 carbon atoms.

If the curing agent is used to cure cycloaliphatic epoxide material, at least one of $R^1$ or $R^2$ is preferably lower alkyl of 1 to 6 carbon atoms and at least one of $R^3$ or $R^4$ is an electron donating group.

Suitable electron donating groups include a hydroxyl group, branched straight chain or cylic alkyl or alkoxy groups having up to 18 carbon atoms and amine groups.

The coated abrasive products according to the present invention are characterized by having at least a make coating or a size coating of epoxy resin binder. This binder coating contains residual curing agent derived from substituted pentafluoroantimonic acid and an aromatic amine selected from the group consisting of aniline and hindered amine.

The invention also provides an improved method of making coated abrasive products. The improved method has the steps of:

(1) uniformly coating a backing sheet with a make coat of a first resinous material in liquid form;

(2) depositing a plurality of abrasive granules uniformly over the surface of the make coat of the first resinous material;

(3) curing the first resinous material to adherently bond the granules to the backing sheet surface;

(4) coating over the make coat and the granules with a size coat of a second resinous material; and (5) curing the resultant coated product until the second resinous material is solid.

The improvement comprises employing, as at least one of the first or the second resinous binder material, a latent, stable curable composition. The curable composition comprises:

(A) epoxy resin composition having a 1,2-epoxy equivalency greater than one; and (B) a curing agent in an amount sufficient to cure the composition of heating comprising substituted pentafluoroantimonic acid having the general formula $H^+SbF_5X^-$ wherein X is halogen, a hydroxy, or an OR group wherein OR is the residue of an aliphatic or aromatic alochol; and aromatic amine selected from the group consisting of aniline and hindered amine. The mole ratio of the substituted pentafluoroantimonic acid to aromatic amine is in the range of 1:1.05 to 1:4.

The following definitions are provided for terms used in the present application:

The term "pot life" or "pot stability" means the time taken for a composition to increase ten-fold in viscosity.

The term "latent" or "latently curable" means an appreciable delay in the cure time or a relatively long pot life or pot stability, preferably 5 days or more.

The term "hindered aromatic amine" means an aromatic compound having an amine nitrogen attached directly to an aromatic group and at least one alkyl group attached to the nitrogen or to a carbon alpha to the carbon atom to which the amino group is attached.

DETAILED DESCRIPTION

The thermally curable resin compositions of the present invention comprise epoxy resin having an epoxide functionality of at least one. The thermally curable resin composition may also include up to one hydroxyl equivalent per epoxy equivalent of an aliphatic alcohol having a hydroxyl functionality of at least one, co-reactive, cationically polymerizable, ethylenically unsaturated monomer, and other additive ingredients conventional in formulating curable compositions of this type.

Examples of aromatic amines useful in preparing the curing agent of the present invention include the following: 2-methylaniline, 2-isopropylaniline, 2-propylaniline, 2-hexylaniline, 2,4-dimethylaniline, 2,5-dimethylaniline, 2,6-dimethylaniline, 2,6-diethylaniline, N,2,6-triethylaniline, N-methyl-2,6-diethylaniline, N,N,2-trimethylaniline, N,N,2,6-tetramethylaniline, 2,6-dipropylaniline, 2,6-diisobutylaniline, 2,6-di-n-butylaniline, 2,6-di-n-pentylaniline, N,N,diethyl-2-n-butylaniline 2,4,6-triethylaniline, N,N-dimethyl-2,6-diethylaniline, 2,3,4,5,6-pentamethylaniline, 1-naphthylamine, 2-methoxyaniline, 2,4-dimethoxyaniline, 2-methoxy-N-methylaniline, N-propylaniline, N-n-hexylaniline, N-sec-butylaniline, N-benzylaniline, N,N,2-trimethylaniline, 2-ethyl-6-sec-butylaniline, m-phenylenediamine, p-phenylenediamine, 2,6-diethyl-m-phenylene-diamine.

The curing agent for use in the curable compositions of the invention are Bronsted acid salts of hindered amines that are prepared by the addition of 1.05 to 4.0 moles of hindered amine to one mole of substituted pentafluoroantimonic acid. The addition is conveniently carried out in a low boiling solvent such as diethyl ether or sulfur dioxide. The substituted antimonic acids are prepared by the addition of one mole of antimony pentafluoride in sulfur dioxide or other suitable solvent to one mole of hydrogen halide, such as HF, HCl, HBr or HI, or water to form hexafluoroantimonic acid, chloropentafluoroantimonic acid, bromopentafluoroantimonic acid, iodopentafluoroantimonic acid, or hydroxypentafluoroantiomonic acid, respectively. Because of the exothermic nature of these reactions, care should be taken to avoid splattering.

The hindered amine salt, in which X is OR, is the most preferred modified Bronsted acid. It is prepared by mixing one molar equivalent of antimony pentafluoride with one or more molar equivalents of an alcohol that is liquid at the reaction temperature. Conveniently, the curing agent is prepared by the addition of one part by weight of antimony pentafluoride to one to ten parts by weight of alcohol followed by the addition of 1.05 to 4.0 moles of hindered aromatic amine. In this method, alcohol used in excess of one mole per mole of antimony pentafluoride performs as solvent during the preparation of the hindered amine salt which, by reason of its hydroxy group, reacts with an epoxide group in the epoxy resin composition. In place of the solvent alcohol (i.e., alcohol in excess of an equivalent of antimony pentafluoride) other electron donating solvents such as diethyl ether, diglyme, and sulfur dioxide may be used.

Alcohols having a hydroxyl functionality of at least one may be used in the present invention as either a co-reactant and solvent in the preparation of the liquid salt of a substituted pentafluoroantimonic acid with hindered amine or as an optional component of the curable epoxy resin composition. Such alcohols may be any aliphatic or aromatic alcohol or a liquid mixture of one or more solid alcohols with one or more liquid alcohols.

Representative examples of suitable aliphatic alcohols having a hydroxyl functionality of one include alkanols, monoalkyl ethers of polyoxyalkylene glycols, monoalkyl ethers of alkylene glycols, and others known to the art.

Representative examples of suitable monomeric aliphatic alcohols having a hydroxyl functionality greater than one include alkylene glycols (e.g., 1,2-ethanediol, 1,3-propanediol, 1,4-butanediol, 2-ethyl-1,6-hexanediol, bis(hydroxymethyl)cyclohexane, 1,18-dihydroxyoctadecane, 3-chloro-1,2-propanediol), polyhydroxyalkanes (e.g., glycerine, trimethylolethane, pentaerythritol, sorbitol) and other polyhydroxy compounds such as N,N-bis(hydroxyethyl)benzamide, 2-butyne-1,4-diol, 4,4'-bis(hydroxymethyl)diphenylsulfone, castor oil, etc.

Representative examples of suitable glycols include polyoxyethylene and polyoxypropylene glycols and triols having molecular weights from about 106 to about 10,000 corresponding to equivalent weight of 53 to 5,000 for the diols or 70 to 3,300 for triols; polytetramethylene glycols of varying molecular weight; copolymers of hydroxypropyl and hydroxyethyl acrylates and methacrylates with other free radical-polymerizable monomers such as acrylate esters, vinyl halides, or styrene; copolymers containing pendent hydroxy groups formed by hydrolysis or partial hydrolysis of vinyl acetate copolymers, polyvinylacetal resins containing pendent hydroxy groups; modified cellulose polymers such as hydroxyethylated and hydroxypropylated cellulose; hydroxy-terminated polyesters and hydroxy-terminated polytactones; and hydroxy-terminated polyalkadienes. Especially preferred are di,tri-, and tetraethylene glycol.

Useful commercially available aliphatic alcohols include glycols commercially available under the registered trademark "Polymeg" (available from Quaker Oats Company) including, for example, polytetramethylene ether glycols such as "Polymeg" 650, 1000 and 2000; glycols commercially available under the trade designation "Pep" (available from Wyandotte Chemicals Corporation) including polyoxyalkylene tetrols having secondary hydroxyl groups such as "Pep" 450, 550 and 650; polyols available under the commercial designation "PCP" (available from Union Carbide) including polycaprolactone polyols such as "PCP" 0200, 0210, 0230, 0240, 0300; aliphatic polyester diols available under the trademark "Paraplex U-148" (available from Rohm and Haas); saturated polyester polyols available under the registered trademark "Multron" (available from Mobay Chemical Co.) such as "Multron" R-2, R-12A, R-16, R-18, R-38, R-68 and R-74; hydroxypropylated cellulose having an equivalent weight of approximately 100 available under the trademark "Klucel E" (available from Hercules Inc.); and cellulose acetate butyrate ester having a hydroxyl equivalent weight of approximately 400 "Alcohol Soluble Butyrate" (available from Eastman Kodak).

Representation examples of suitable aromatic alcohols include phenols such as phenol, cardinol, m-cresol, 2-methyl-5-isopropylphenol (carvacrol), 3-methyl-6-tertbutylphenol, 2,4-dimethyl-6-tert-butyl phenol, guaiacol, m-, o-, and p-chlorophenol.

The amount of alcohol used in the compositions of the invention depends upon factors such as compatibility of the hydroxyl-containing material with the epoxide, the equivalent weight and functionality of the hydroxy-containing material, the physical properties desired in the final cured compositions, the desired speed of cure, etc.

Generally speaking, with increasing amounts of alcohol in the composition, the cured product exhibits improved impact resistance, adhesion to substrates, flexibility, and decreased shrinkage during curing, and correspondingly there is a gradual decrease in hardness, tensile strength and solvent-resistance.

Although both mono-functional and poly-functional hydroxy-containing materials provide desirable results in the compositions of the invention, use of the poly-functional hydroxy-containing materials is highly preferred for a majority of applications, although the mono-functional hydroxy-containing materials are particularly effective in providing low viscosity, solvent-free coating compositions. When using hydroxyl-containing organic materials having a functionality significantly less than 2 (e.g., to 1 to 1.5), amounts greater than about 0.2 equivalent of hydroxyl per equivalent of epoxy tend to provide cured compositions which are generally low in internal strength and tensile strength and are susceptible to solvent attack, and consequently may be unsuitable for some applications. This tendency becomes increasingly more apparent with increasing equivalent weight of the hydroxy-containing material. Accordingly, when using mono-functional hydroxy materials it is preferred that the equivalent weight thereof be no greater than about 250.

When poly-functional, hydroxy-containing organic material is used, an amount having up to one equivalent of hydroxy, preferably 0.2 to 0.5 equivalents of hydroxy per equivalent of epoxy can be used. Generally speaking, the higher the hydroxyl equivalent weight the more effective such material is in imparting a given degree of toughness and flexibility to the cured epoxy resin composition.

Mixtures of hydroxyl-containing materials may be used, when desired. For example, one may use mixtures of two or more poly-functional hydroxy materials, one or more monofunctional hydroxy materials with poly-functional hydroxy materials etc.

The epoxide group containing materials that can be used in the curable composition of the invention are well known. They can be any organic compound having at least one oxirane ring, i.e.,

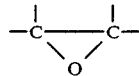

that is polymerizable by ring opening. Such materials may be monomeric or polymeric and aliphatic, cycloaliphatic, or heterocyclic but are preferably aromatic. These materials generally have, on the average, at least 1.5 polymerizable epoxy groups per molecule (preferably two or more epoxy groups per molecule). The polymeric epoxides include linear polymers having terminal epoxy groups (e.g., a diglycidyl ether of a polyoxyalkylene glycol), polymers having skeletal oxirane units (e.g., polybutadiene polyepoxy), and polymers having pendent epoxy groups (e.g., a glycidyl methacrylate polymer or copolymer). The epoxides may be pure compounds but are generally mixtures containing one, two, or more epoxy groups per molecule. The "average" number of epoxy groups per molecule is determined by dividing the total number of epoxy groups in the epoxy-containing material by the total number of epoxy molecules present.

These epoxy group-containing materials may vary from low molecular weight materials up to 100,000 or more. Mixture of various epoxy group-containing materials may be used in the compositions of this invention.

Useful epoxy-containing materials include those which contain cyclohexene oxide groups such as the epoxycyclohexane carboxylate, typified by 3,4-epoxycyclohexylmethyl 3,4-epoxycyclohexanecarboxylate, 3,4-epoxy-2-methylcyclohexylmethyl 3,4-epoxy-2-methylcyclohexane carboxylate, and bis(3,4-epoxy-6-methylcyclohexylmethyl)adipate. For a more detailed list of useful epoxides of this nature, reference is made to the U.S. Pat. No. 3,117,099, incorporated herein by reference.

Further epoxy-containing materials which are particularly useful in the practice of this invention include glycidyl ether monomers of the formula

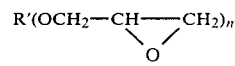

wherein R' is alkyl but preferably is aryl and n is an interger of 1 to 6. Examples are glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol)propane). Further examples of epoxides of this type which can be used in the practice of this invention are described in U.S. Pat. No. 3,018,262, incorporated herein by reference and in "Handbook of Epoxy Resins" by Lee and Neville, McGraw-Hill Book Co., New York (1967).

Typical examples of preferred aromatic glycidyl ethers are the diglycidyl ethers of bisphenol A-epichlorohydrin resins include:

"Epon" 562 ("Epon" is a trademark product of Shell Chemical Company) which is an uncured epoxy (liquid) having an epoxide equivalent weight (number of grams of resin containing one gram equivalent of epoxide) of 140 to 165 and an average molecular weight of 300;

"Epon" 815 which is an uncured epoxy (liquid) having an epoxide equivalent weight of 175 to 210 and an average molecular weight of 340 to 400;

"Epon" 820 which is an uncured epoxy (liquid) having an epoxide equivalent weight of 175 to 210 and an average molecular weight of 350 to 400;

"Epon" 828 which is an uncured epoxy (liquid) having an epoxide equivalent of about 190 and an average molecular weight of 350 to 400;

"Epon" 834 which is an uncured epoxy (liquid) having an epoxide equivalent weight 225 to 290 and an average molecular weight of 450;

"DER" 331 ("DER" is a trademark product of Dow Chemical Company) which is an epoxy resin having an epoxide equivalent weight of 182 to 190 and a viscosity of 10,000 to 16,000 cps;

"Epon" 1310 which is understood to be the condensation product of 1,1,2,2-tetrabis (4-hydroxyphenyl) ethane and epichlorochydrin having an average of about three glycidl ether groups in the molecule;

"Epon" 812 is a liquid glycerol polyglycidyl ether resin marketed by Shell Chemical Company having a 3 max. Gardener color, 1.0 to 1.7 poises viscosity at 25° C., and 140 to 160 epoxy equivalent weight, as noted in Modern Plastics Encyclopedia, 1965, Vol. 42. No. 1a, p. 206, New York, N.Y., McGraw-Hill, Inc. (September 1964);

"Epon" 826 is a liquid bisphenol A-diglycidyl ether resin marketed by Shell Chemical Company having a 2 max. Gardener color, 65 to 95 poises viscosity at 25° C., and 180 to 188 epoxy equivalent weight, as noted in Modern Plastics Encyclopedia, 1965, Vol. 42, No. 1a, p. 206, New York, N.Y., McGraw-Hill, Inc. (September 1964);

"Araldite" 6004 is a liquid bisphenol A-diglycidyl ether resin marketed by Ciba Products Company having a 185 epoxy equivalent weight, and 5,000 to 6,000 centipoises of viscosity at 25° C. as disclosed in U.S. Pat. No. 2,633,458; and

"ERL" 2772 is a liquid bisphenol A-diglycidyl ether resin marketed by Union Carbide Plastics Division having a 7,000 to 9,000 centipoise viscosity at 25° C. and 175 to 185 epoxy equivalent weight. Also see Example 1 of U.S. Pat. No. 2,506,486, issued May 2, 1950 (Howard L. Bender et al) entitled "Thermosetting Resin From a Diphenol and a Diglycidyl Ether of a Diphenol."

Still other aromatic glycidyl ethers that may be used are the reaction products of epichlorohydrin with polyhydric phenols including resorcinol, catechol, hydroquinone, phloroglucinol and the polynuclear phenols including p,p-dihydroxydibenzyl, p,p-dihydroxydiphenyl, p,p'dihydroxyphenyl sulfone, p,p'dihydroxybenzophenone, 2,2'dihydroxy-1,1'-dinaphthylemethane, and the 2,2'; 2,3'; 2,4; 3,3'; 3,4'; and 4,4' isomers of dihydroxydiphenylmethane, dihydroxydiphenyldimethylmethane, dihydroxydiphenylethylmethylmethane, dihydrodiphenylmethylpropylmethane, dihydroxydiphenylethylphenylmethane, dihydroxydiphenylpropylphenylmethane, dihydroxydiphenylbutylphenylmethane, dihydroxydiphenyltolymethane, dihydroxydiphenyltolylmethylmethane, dihydroxydiphenyldicyclohexylmethane, dihydroxydiphenylcyclohexane, poly-hydric phenolic formaldehyde condensation products, and the like. Preferred polyglycidyl polyethers are those which contain as reactive groups only epoxy groups and hydroxyl groups. Where the aromatic glycidyl ether has a melting point above 30° C., it is desirable that the epoxy resin composition also contain material having a hydroxyl group or material having co-reactive ethylenic unsaturation or both so that the mixture has a melting point below about 30° C.

Co-reactive cationically polymerizable monomers which, as mentioned above, are an optional component with the epoxy material that may be used in the compositions of this invention are any of the cationically polymerizable ethylenically unsaturated monomers, preferably having up to 12 carbon atoms and optionally up to two atoms of oxygen and nitrogen. Examples of such cationically polymerizable monomer include aliphatic olefins such as isobutylene, isoamylene, butadiene and isoprene; cycloolefins such as dipentene (limonene) aromatic olefins such as styrene, α-methylstyrene, t-butystyrene, αchlorostyrene, 1-vinylnaphthalene and 2-vinylnaphthalene; vinyl ethers such as methyl vinyl ether, ethyl vinyl ether, n-pentyl vinyl ether, dodecyl vinyl ether, and divinyl ether; vinyl ketones, such as methyl vinyl ketone and hydroxy methyl vinyl ketone; vinyl heterocyclics such as N-vinyl-2-pyrrolidinone and N-isopropenyl-2-pyrrolidinone. The preferred cationically polymerizable monomers are the olefins, most preferably styrene and dipentene.

There can be used in the curable composition up to about two parts, preferably 0.1 to 0.5 parts, by weight of ethylenically unsaturated monomer per part of epoxy material.

The compositions are made by mixing in any order the epoxy material and the curing agent described above and, when used, the alcohol and cationically polymerizable monomers. It, however, is preferable to add the curing agent to the alcohol and add this mixture to the epoxy material that may contain the cationically polymerizable monomers.

The amount of curing agent needed to cure the curable composition is preferably no more than that amount needed for this purpose. Effective curing has been observed when the curable composition contains curing agent which results in an antimony concentration of about 2 to about 500 millimoles per kilogram total weight of curable composition. Excessive concentrations of curing agent are preferably avoided since they are wasteful but not harmful to the result desired.

The conventional components going to form the coated abrasive product of the invention will be selected from those typically used in this art. The backing, as previously mentioned, may be formed of paper, cloth, vulcanized fiber, film or any other backing material known for this use. The abrasive granules may be of any conventional grade utilized in the formation of coated abrasives and may be formed of flint, garnet, aluminum oxide, alumina:zirconia, diamond and silicon carbide, etc., or mixtures thereof. The frequency of the abrasive granules on the sheet will also be conventional. The abrasive granule may be oriented or may be applied to the backing without orientation, depending upon the requirement of the particular coated abrasive product. Either the make coat or the size coat of the coated abrasive product may be formed of a resinous material known for this use, the remaining coat, of course, being formed of epoxy according to the invention. Both the make and size coat may be formed of epoxy.

The use of epoxy binder for coated abrasives according to the present invention avoids many of the problems which plague binders generally used in coated abrasives. Epoxy does not require prolonged heating and/or dwell times before subsequent coatings may be applied to make coatings. Unlike glue, epoxy is unaffected by moisture. In fact, coated abrasive products having epoxy as a binder perform well under wet grinding conditions. Unlike varnish, epoxy may be applied with little or no solvent and may be cured in a much shorter processing time. Varnish softens during wet grinding while the epoxy is not deleteriously affected. Curing of epoxy is accomplished much more rapidly then phenolic resin.

The coated abrasive product of the invention may also include such modifications as are known in this art. For example, a back coating such as pressure-sensitive adhesive may be applied to the backing and various supersizes may be applied to the abrasive surface, such as zinc stearate to prevent abrasive loading, and others.

EXAMPLES

The invention will be further and more specifically illustrated by the following nonlimiting examples, wherein all parts are by weight unless otherwise specified.

Examples 1–75 disclose examples of resin binder systems and Examples 76–77 disclose examples of coated abrasive products.

In certain of the Examples there is given the results of "Lap Shear Test". The Lap Shear Test is ASTM Standard Method No. D 1002-2 of Test for Strength Properties of Adhesives in Shear by Tension Loading Metal-to-Metal with the following modifications:

1. The adherends (or test panels) were 2024 T3 bar aluminum sheet 1.60 mm (63 mils) thick × 102 mm (4.0 in) wide × 178 mm (7.0 in) long;
2. The adherends were prepared with an "FPL etch" (i.e., immersed in a sulfuric acid-chromic acid bath), rinsed with tap water, and dried;

3. The components of the adhesive were weighed, then mixed by hand for two minutes until homogeneous;
4. The laminated panels were prepared by spreading adhesive at a thickness of about 0.81 mm (32 mils) onto one adherend over an area of about 75 mm (3 in)×175 mm (6 in), leaving an uncoated area of about 50 mm (2 in)×75 mm (3 in) and using as spacers glass thread of about 0.1 mm in diameter that was placed in the adhesive; and
5. The adherends were held in place by a short strip of tape placed about the sides of the overlap.

Test Procedure

The assembled test panels were stacked on a smooth horizontal surface in an oven preheated to the test temperature in the following order: (1) two laminated panels, (2) two 100 mm×200 metal plates weighing about 4.5 kg each, (3) two lapped panels, and (4) one 100 mm×200 metal plate weighing about 4.5 kg., the metal plates having been preheated to the test temperature. The metal plates were used to apply pressure to the bonds. Below, above, and between the test panels, strips of cardboard were placed to insure even distribution of pressure on the test panels and release paper was used to prevent the panels from being bonded one to the other by adhesive that might be pressed from each assembly. The assembled stacks were left in the oven for one hour, then removed from the oven and allowed to cool.

EXAMPLE 1

This example illustrates the preparation of a hindered amine Bronsted acid salt curing agent according to the present invention.

Into a 100 ml 3-neck flask equipped with a stirrer, addition funnel, thermometer, and apparatus for exclusion of atmospheric moisture was placed 21.7 g (0.2 mole) diethylene glycol (DEG) that had been dried by passage through molecular seives. (In subsequent preparations, it was found that drying was unnecessary) The flask was fitted with an ice water bath and the contents cooled to about 5° C. To the cooled contents was added dropwise over a 10 minute period via the addition funnel, while stirring the mixture, 21.7 (0.1 mole) g of antimony pentafluoride. During the addition, the temperature rose to about 62° C. The mixture was cooled to 25° C. and there was then added dropwise 16.4 g (0.11 mole) 2,6-diethylaniline (DEA) over a period of 10 minutes, causing the temperature to rise to about 50° C. There was obtained a dark greenish-yellow fluid having about 1.1 mole of hindered aromatic amine per mole of antimonic acid. This product was designated curing agent "A".

Carbon-13 NMR spectra on a sample of curing agent "A" showed minor absorption peaks at 65.8 ppm and 72.7 ppm and major absorption peaks at 62.0 ppm and 72.4 ppm. The two minor peaks are unchanged from the absorption peaks of coordinated diethylene glycol-antimony pentafluoride in the absence of DEA. Absorption peaks, typical of an aromatic amine salt were also seen at 129.3(C-1), 137.4(C-2), 127.9(C-3,5), and 130.4 ppm. This data indicates a salt having the formula

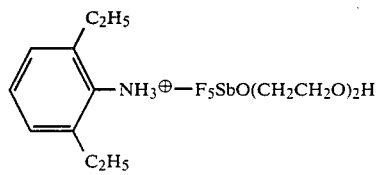

Infrared spectrum of a sample of the reaction fluid showed broad bands in the 2,500 to 3,500 cm$^{-1}$ region and a band at 2,570 cm$^{-1}$ supporting further the presence of a salt of the above formula.

EXAMPLE 2

Into a mixture of 80 g "Epon" 828 (a trademark product of Shell Chemical Company which is an uncured glycidyl ether of bisphenol A having an epoxide-equivalent weight of about 190 and an average molecular weight of 350 to 400) and 20 g diethylene glycol was added 7.3 g (containing 0.01 mole antimonic acid, 0.011 mole hindered amine and 0.02 mole of aliphatic alcohol) of curing agent "A". A ten gram portion of the mixture gelled in 6 seconds on heating at 150° C.

Lap shear was determined on laminated panels that had been heated at 120°/C. for one hour to cure the adhesive composition. A lap shear of 3000 psi (20.7 MPa*) was observed.
*Megapascal A portion of the mixture was stored at 25° C. Viscosity increased from 1,000 centipoise to 10,000 centipoise in 5 days.

EXAMPLES 3-9

These examples illustrate the effect of varying the ratio of hindered aromatic amine to antimony in substituted pentafluoroantimonic salts on the characteristics of epoxy resin compositions.

A stock solution containing one part antimony pentafluoride to one part by weight of diethylene glycol was prepared as described in Example 1. To 4.2 g, containing 0.01 mole of substituted pentafluoroantimonic acid, was added 0.009 to 0.031 mole of 2,6-diethylaniline and 20 g diethylene glycol. The mixture was thoroughly mixed and 80 g of "Epon" 828 stirred into it. The pot life, gel time, and lap shear strength of each composition was determined and is recorded in Table I below.

TABLE I

| Ex. No. | Ratio[a] | Pot Life[c] Days | Gel Time Sec. at 150° C. | Lap Shear[b] MPa |
|---|---|---|---|---|
| 3 | 0.9 | 0.25 | 1 | 24.2 |
| 4 | 1.0 | 2 | 4 | 25.0 |
| 5 | 1.1 | 5 | 6 | 24.2 |
| 6 | 1.6 | 7 | 10 | 17.9 |
| 7 | 2.0 | 10 | 25 | 20.7 |
| 8 | 2.6 | 11 | 40 | 15.9 |
| 9 | 3.1 | 13 | 100 | 15.9 |

[a]ratio of moles of hindered amine to mole of substituted pentafluoroantimonic acid
[b]determined on laminated panels cured at 120° C.
[c]time for viscosity to increase 10-fold.

It is to be observed in Table I that at amine to substituted pentafluoroantimonic acid ratios of 1.0 or less there results a rapid gel time and excellent lap shear, but an undesirably short pot life of less than 1 day. At ratios of 1.1 to 3.1, the pot life is 5 days or longer, gel times are 100 seconds or shorter and lap shear is 15.9 to 20.7 MPa. At ratios of about 4.0, gel times rise rapidly and lap shear decreases rapidly indicating increasingly poorer curing of the compositions.

EXAMPLES 10-25

These examples illustrate compositions in which aniline and various hindered aromatic amines are used in the preparation of the curing agent of the invention.

Compositions were prepared as described in Examples 3-9 with the exception that, in place of 0.009 to 0.031 mole of 2,6-diethylaniline, there was used 0.02 mole of various hindered aromatic amines as shown in Table II below providing a molar ratio of hindered aromatic amine to substituted pentafluoroantimonic acid of two.

TABLE II

| Ex. No. | Hindered Amine | Pot Life (days) | Gel Time$^{(d)}$ (sec.) | Lap Shear (MPa) |
|---|---|---|---|---|
| 10 | Aniline | 5 | 20 | 20.7 |
| 11 | N—methylaniline | 6 | 140 | 14.5 |
| 12 | N,N—dimethylaniline | 15 | 180 | (e) |
| 13 | 2-methylaniline | 10 | 50 | 20.7 |
| 14 | 2,6-dimethylaniline | 9 | 60 | 17.2 |
| 15 | 2,6-diethylaniline | 10 | 25 | 20.7 |
| 16 | 2-methyl-6-propyl-aniline | 10 | 50 | 19.3 |
| 17 | 2-ethyl-6-propyl-aniline | 10 | 30 | 17.4 |
| 18 | 2-ethyl-6-sec-butyl-aniline | 10 | 35 | 15.2 |
| 19 | 2-methoxyaniline | 16 | 150 | 20.0 |
| 20 | N—propylaniline | 9 | 30 | 20.0 |
| 21 | N—sec-butylaniline | 30 | 50 | 17.9 |
| 22 | N,N—diethylaniline | >60 | 180 | (e) |
| 23 | N,N,2-trimethylaniline | >60 | 100 | 13.8 |
| 24 | N,N—diethyl-2,5-dimethylaniline | >60 | 90 | 9.7 |
| 25 | 1-(dimethylamino)-naphthaline | | 30 | 18.6 |
| 26 | 2-isopropylaniline | 7 | 20 | 17.2 |
| 27 | 2,6-diethyl-m-phenylene-diamine | 10 | 25 | 24.1 |
| 28 | p-phenylenediamine | 10 | 50 | 20.0 |
| 29 | 2,3-dimethylaniline | 11 | 55 | 20.7 |
| 30 | 2,6-diisopropylaniline | 10 | 30 | 17.9 |
| 31 | 2,4,6-trimethylaniline | 15 | 120 | 21.4 |
| 32 | 4-methoxyaniline | 12 | 130 | 19.3 |
| 33 | 2,4-dimethoxyaniline | >10 | 60 | 20.0 |
| 34 | 2,6-diethyl-N—methylaniline | 10 | 25 | 20.7 |
| 35 | 2,6-diethyl-N,N—dimethylaniline | 7 | 15 | 13.8 |

$^{(d)}$at 150° C.
$^{(e)}$the composition does not cure

By inspection of Table II, aniline and a number of hindered amines are shown to provide compositions having long pot life but rapid cure. Examples 12 and 22 with N,N-dimethylaniline and diethylaniline show long pot life and long gel time at 150° C. and also do not cure satisfactorily.

EXAMPLES 36-38

These examples illustrate the effect of various concentrations of catalyst system on the characteristics of cured epoxy resin composition.

A catalyst system was prepared by adding to 42 g of the stock solution described in Example 3-9, containing 0.1 mole of substituted pentafluoroantimonic acid and 30 g (0.2 mole) of 2,6-diethylaniline. Then, in separate containers containing 80 g "Epon" 828 and 20 g diethylene glycol, were added 1.8 g, 0.7 g, and 0.2 g of the curing agent containing $2.5\times10^{-3}$, $1\times10^{-3}$ and $3\times10^{-4}$ mole of substituted pentafluoroantimonic acid, respectively. The pot life, gel time and lap shear were determined for each composition and they are recorded in Table III below. The composition of Example 2 containing the same curing agent with 0.01 mole of substituted pentafluoroantimonic acid is also included in Table III for comparison.

TABLE III

| Ex. No. | Curing Agent (grams) | Pot Life (days) | Gel Time (sec.) | Lap Shear Temp. of cure 93° C. | Lap Shear Temp. of cure 120° C. |
|---|---|---|---|---|---|
| 2 | 7.2 | 10 | 25 | — | 20.7 |
| 36 | 1.8 | 13 | 20 | 23.5 | 25.5 |
| 37 | 0.7 | 15 | 25 | 21.4 | 26.2 |
| 38 | 0.2 | 19 | 110 | no cure | 16.6 |

It is apparent from Table III that the curing agents of the invention are effective in providing long pot life, rapid gelling and good cure in concentrations as low as $3\times10^{-4}$ mole of substituted pentafluoroantiomonic acid salt per 100 grams of reaction composition.

EXAMPLES 39-51

These examples illustrate use of various catalysts systems for the curing cycloaliphatic epoxy material-diethylene glycol mixtures.

Compositions were prepared by adding 0.01 mole of the amines listed below in Table IV and 2.1 g portions of the antimony pentafluroide-diethylene glycol stock solution described in Examples 3-9 (containing 0.005 mole of substituted pentafluoroantimonic acid) to 20 g diethylene glycol and thoroughly mixing. To this mixture was then added 80 g "ERL" 4221 (the commercial designation of a product of Union Carbide Corp. for 3,4-epoxycyclohexylmethyl 3,4-epoxycyclohexanecarboxylate). The pot life and lap shear strength of each composition was determined and is recorded in Table IV.

TABLE IV

| Ex. No. | Aromatic Amine | Pot Life$^{(c)}$ (days) | Lap Shear$^{(b)}$ (MPa) |
|---|---|---|---|
| 39 | aniline | 0.08 | (f) |
| 40 | 2,6-dimethylaniline | 0.04 | (f) |
| 41 | 2,6-diisopropylaniline | 0.04 | (f) |
| 42 | 2,6-di-sec-butylaniline | | (f) |
| 43 | N—propylaniline | 0.04 | (f) |
| 44 | N—sec-butylaniline | 0.08 | (f) |
| 45 | N,N—dimethylaniline | 0.01 | (f) |
| 46 | N,N—dimethylaniline | 0.7 | 20.0 |
| 47 | N,N—dimethyl-2-methylaniline | 0.8 | 18.6 |
| 48 | N,N—diethyl-4-methylaniline | 4.0 | 11.0 |
| 49 | N,N—diethyl-2,5-dimethylaniline | 10 | 20.0 |
| 50 | N—methyl-2,6-diethylaniline | 7 | 18 |
| 51 | 2,4-dimethylaniline | 1.3 | |

$^{(b)}$cure one hour at 120° C.
$^{(c)}$at 25° C.
$^{(f)}$not determined because of very short pot life

EXAMPLES 52-63

These examples illustrate the use of several alcohols useful in preparing the curing agent of the present invention.

Stock solutions containing antimony pentafluoride and separately the various alcohols were prepared as described in Example 1. To each of these stock solutions were added 1.0 to 1.1 moles of 2,6-diethylaniline per mole of antimony pentafluoride. The various curing agents thus prepared were thoroughly mixed into 80 g of "Epon" 828 and 17 g of dipentene and evaluated for pot life and gel time as shown in Table V.

TABLE V

| Ex. No. | Alcohol | Alcohol/SbF$_5$[a] wt. ratio | Moles[b] Catalyst | Amine/SbF$_5$[c] mole ratio | Gel Time at 150° C. (sec.) | Pot Life (days) |
|---|---|---|---|---|---|---|
| 52 | diethylene glycol | 1.0 | 0.005 | 1.0 | — | 0.04 |
| 53 | diethylene glycol | 1.0 | 0.005 | 1.1 | 6 | 3 |
| 54 | triethylene glycol | 1.2 | 0.005 | 1.0 | 5 | 2 |
| 55 | triethylene glycol | 1.2 | 0.005 | 1.1 | 8 | 6 |
| 56 | ethyl | 1.0 | 0.005 | 1.0 | — | 0.007 |
| 57 | ethyl | 1.0 | 0.005 | 1.1 | 7 | 3 |
| 58 | m-cresol | 1.0 | 0.005 | 1.0 | 17 | 6 |
| 59 | m-cresol | 1.0 | 0.005 | 1.1 | 22 | 8 |
| 60 | hexyl | 1.0 | 0.005 | 1.0 | 7 | 1 |
| 61 | hexyl | 1.0 | 0.005 | 1.1 | 9 | 6 |
| 62 | PPG-1025[d] | 5.6 | 0.007 | 1.0 | 9 | 1 |
| 63 | PPG-1025 | 5.6 | 0.007 | 1.1 | 10 | 5 |

[a]weight ratio of alcohol to antimony pentafluoride in the various stock solutions prepared as described in Example 1.
[b]moles of substituted pentafluoroantimonic acid per 80 g "Epon" 828 and 17 g dipentene mixture.
[c]Ratio of moles of 2,6-diethylaniline to mole of substituted pentafluoroantimonic acid.
[d]"PPG"-1025 is a polypropylene glycol with an average molecular weight of 1007, available from Union Carbide Corporation.

EXAMPLES 64–75

These examples illustrate compositions in which various epoxy resins are cured with the curing agent of the present invention.

A stock solution containing one part antimony pentafluoride to one part by weight of diethylene glycol was prepared as described in Example 1. To this stock solution was added 1.0 to 2.0 moles of 2,6-diethylaniline per mole of antimony pentafluoride. These various curing agents were thoroughly mixed into 80 g of epoxy resin and 17 g of dipentene and evaluated for pot life and gel times as shown in Table VI.

TABLE VI

| Ex. No. | Epoxy Resin | Moles[a] Catalyst | Amine/ SbF$_5$[b] mole ratio | Gel Time at 150° C. (sec.) | Pot Life (days) |
|---|---|---|---|---|---|
| 64 | Epon 828 | 0.005 | 1.0 | — | <0.04 |
| 65 | Epon 828 | 0.005 | 1.1 | 6 | 3 |
| 66 | Epon 828 | 0.004 | 2.0 | 26 | 23 |
| 67 | D.E.R. 332[c] | 0.005 | 1.0 | — | <0.04 |
| 68 | D.E.R. 332 | 0.005 | 1.1 | 6 | 3 |
| 69 | D.E.R. 332 | 0.004 | 2.0 | 20 | 20 |
| 70 | Epon 871[d] | 0.005 | 1.0 | 13 | <1 |
| 71 | Epon 871 | 0.005 | 1.1 | 18 | 22 |
| 72 | Epon 871 | 0.004 | 2.0 | 38 | >41 |
| 73 | D.E.N. 431[e] | 0.005 | 1.0 | — | <0.04 |
| 74 | D.E.N. 431 | 0.005 | 1.1 | 6 | 1 |
| 75 | D.E.N. 431 | 0.004 | 2.0 | 18 | 17 |

[a]Moles of substituted pentafluoroantimonic acid per 80 g epoxy resin and 17 g dipentene mixture.
[b]Ratio of moles of 2,6-diethylaniline to mole of substituted pentafluoroantimonic acid.
[c]"D.E.R." 332 is a virtually pure liquid bisphenol A-diglycidyl ether resin marketed by the Dow Chemical Company and having an epoxy equivalent weight of 172–176.
[d]"Epon" 871 is a liquid diglycidyl ester of linoleic dimer acid resin marketed by the Shell Chemical Company and having an epoxy equivalent weight of 390–470.
[e]"D.E.N." 431 is an epoxy novalac resin marketed by the Dow Chemical Company having an epoxy equivalent weight of 172–179 and a viscosity of 1100–1700 cps at 52° C.

EXAMPLES 76–77

A coated abrasive paper backing ("E" weight paper 130 pounds per 480 sheet ream or 220 g/m$^2$) was coated with a mixture of 90 parts epoxy resin (available under the trade designation "Epon" 828), 7 parts dipentene, and 3 parts of curing agent "A" of Example 1 to provide a coating weight before drying of 26 grains per 4-inch by 6-inch segment (about 110 grams per sq. meter). Grade 36 (average particle size 653 micrometers) aluminum oxide mineral was electrostatically deposited upon the freshly coated surface to provide an abrasive coating weight of 120 grains per 4-inch by 6-inch segment (about 500 grams per sq. meter). The resinous coating was then cured in a forced air oven with a first zone heated at 265° F. (129° C.) with a 40 second residence time therein, a second zone heated at 300° F. (149° C.) with a 40 second residence time therein and a third zone heated at 285° F. (141° C.) with a 40 second residence time therein. Thereafter a size coating comprised of a mixture of 81 parts epoxy resin ("Epon" 828), 16 parts dipentene and 3 parts of curing agent A" of Example 1 was applied to the abrasive covered surface of the cured composite to provide a coating weight before drying of 32.5 grains per 4-inch by 6-inch segment (about 135 grams per sq. meter). The size coating was cured at 250° F. (121° C.) for 4 minutes.

EXAMPLE 77

Following the procedure of Example 76, another coated abrasive product, identified herein as Example 77, was prepared. The specifications of Example 77 are set forth in Table VII.

TABLE VII

| Backing | Backing wt. (g/m$^2$) | Make Resin wt.[1] (g/m$^2$) | Size Resin wt.[2,3] (g/m$^2$) | Mineral | Grade[4] | Mineral wt (g/m$^2$) | Make cure oven temp (°C.) | | |
|---|---|---|---|---|---|---|---|---|---|
| | | | | | | | Zone 1 | Zone 2 | Zone 3 |
| Paper | 150 | 36 | 102 | Al$_2$O$_3$ | 80 | 176 | 149 | 154 | 146 |

[1]Make resin mixture: 87 parts "Epon" 828, 10 parts dipentene, 3 parts curing agent "A" of Ex. 1.
[2]Size resin mixture: 80 parts "Epon" 828, 17 parts dipentene, 3 parts curing agent "A" of Ex. 1.
[3]Size oven cure: 118° C. for 5 minutes.
[4]Average particle size 241 micrometers.

Test samples of Examples 76–77 were cut and installed in a Schiefer testing machine for evaluation of abrasiveness. These samples were compared to commercially available control coated abrasive samples of the same abrasive grade available from the Minnesota Mining and Manufacturing Company under the trademark "Production Paper" glue bond abrasive paper. Example 76 was tested on "Plexiglas" acrylate resin workpieces while Example 77 was tested on "Plexiglas" acrylate resin, wood (maple) and a commercial polyester body filler compound. Results of these tests are shown below in Table VIII and reported relative to controls.

TABLE VIII

| Ex. No. | Relative Abrasiveness (%) | | |
|---|---|---|---|
| | "Plexiglas" | Wood (maple) | Body Filler |
| 76 | 119 | — | — |
| 77 | 125 | 131 | 148 |

We claim:

1. In a coated abrasive product including abrasive granules which are supported on and adherently bonded to at least one major surface of a backing sheet by a make coating of a first resinous binder material and a size coating of a second resinous binder material, the improvement comprising at least one of the said resinous materials being epoxy resin, said epoxy resin characterized by comprising cured epoxy resin and residual curing agent derived from substituted pentafluoroantimonic acid and an aromatic amine selected from the group consisting of aniline and hindered amine.

2. The abrasive product of claim 1 wherein said backing sheet is formed of paper, film, fiber, or woven cloth.

3. The abrasive product of claim 1 wherein said abrasive granules are selected from the group consisting of flint, garnet, aluminum oxide, alumina:zirconia, diamond, and silicon carbide.

4. In a coated abrasive product including abrasive granules which are supported on and adherently bonded to at least one major surface of a backing sheet by a resinous binder material, the improvement comprising epoxy resin as the resinous binder material, said epoxy resin being characterized by comprising cured epoxy resin and residual curing agent derived from substituted pentafluoroantimonic acid and an aromatic amine selected from the group consisting of aniline and hindered amine.

5. In a method of making coated abrasive products having the steps of
(1) uniformly coating a backing sheet with a make coat of a first resinous material in liquid form;
(2) depositing a plurality of abrasive granules uniformly over the surface of said make coat of first resinous material;
(3) curing said first resinous material to adherently bond said granules to said backing sheet surface;
(4) coating over said make coat and said granules with a size coat of a second resinous material; and
(5) curing the resultant coated product until said second resinous material is solid, the improvement comprising employing, as at least one of said first or said second resinous binder materials, a latent room-temperature stable, curable system comprised of
(A) epoxy resin composition having a 1,2-epoxy equivalency greater than one; and
(B) a curing agent in an amount sufficient to cure said composition on heating comprising (1) substituted pentafluoroantimonic acid having the general formula $H^+SbF_5X^-$ wherein X is halogen, a hydroxy, or an OR group wherein OR is the residue of an aliphatic or aromatic alcohol; and
(2) an aromatic amine selected from the group consisting of aniline; and hindered amine the mole ratio of said substituted pentafluoroantimonic acid to aromatic amine being in the range of 1:05 to 1:4.

6. The method of claim 5 wherein said hindered amine has the general formula

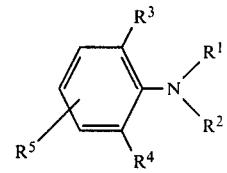

wherein:
$R^1$ and $R^2$ are independently hydrogen, primary or secondary lower alkyl group having 1–6 carbon atoms, or benzyl;
$R^3$, $R^4$, and $R^5$ are independently hydrogen, an electron donating group, benzyl, or at least one of $R^3$ and $R^4$ is joined together with $R^5$ to form a benzo group; provided that,
if no benzo group is present in said hindered amine, at least one of $R^1$, $R^2$, $R^3$, and $R^4$ is an alkyl group or an electron donating group; and
if $R^3$, $R^4$ and one of $R^1$ or $R^2$ is hydrogen, the other $R^1$ or $R^2$ is an alkyl group having at least 2 carbon atoms.

7. The method of claim 5 wherein said OR group is 2-(2-hydroxyethoxy)ethoxy.

8. The method of claim 5 wherein said OR group is the residue of an aliphatic alcohol having a molecular weight of at least 32 and a primary or secondary hydroxyl functionality of at least 1.

9. The method of claim 5 wherein said alcohol is selected from the group consisting of ethylene glycol, diethylene glycol and triethylene glycol.

10. The method of claim 5 wherein said hindered amine is selected from the group consisting of N-methyl-2,6-diethylaniline, 2,6-dimethylaniline, 2,6-diethylaniline, N-sec butylaniline, N,N-diethyl-2,5-dimethyl aniline and N,N-diethyl-2-methylaniline.

11. The method of claim 5 wherein said A also includes up to one hydroxyl equivalent per epoxy equivalent of an alcohol having a functionality of at least one.

12. The method of claim 5 wherein said A also includes coreactive cationically polymerizable ethylenically unsaturated monomer.

13. The method of claim 12 wherein said cationically polymerizable ethylenically unsaturated monomer is selected from the group consisting of styrene, t-butyl styrene, dipentene, and indene.

14. The method of claim 5 wherein said curing agent is contained in a concentration which results in a concentration of 2 to 500 millimoles of antimony per kilogram total weight of curable composition.

* * * * *

UNITED STATES PATENT AND TRADEMARK OFFICE
CERTIFICATE OF CORRECTION

PATENT NO. : 4,553,982

DATED : November 19, 1985

INVENTOR(S) : GERALD E. KORBEL, JANIS ROBINS and HAROLD E. RUDE

It is certified that error appears in the above-identified patent and that said Letters Patent is hereby corrected as shown below:

Claim 5, Col. 18, line 10,

"1:05 to 1:4" should read --1:1.05 to 1:4.--

Signed and Sealed this

Twenty-second Day of July 1986

[SEAL]

Attest:

DONALD J. QUIGG

Attesting Officer

Commissioner of Patents and Trademarks